United States Patent [19]

Nordström

[11] Patent Number: 4,688,444
[45] Date of Patent: Aug. 25, 1987

[54] CONTROL DEVICE

[75] Inventor: Lennart Nordström, Linköping, Sweden

[73] Assignee: Saab-Scania Aktiebolag, Linkoping, Sweden

[21] Appl. No.: 862,261

[22] Filed: May 12, 1986

[51] Int. Cl.$^4$ .............................................. H01H 9/00
[52] U.S. Cl. ............................ 74/471 R; 74/471 XY; 273/DIG. 28; 336/135
[58] Field of Search ........................ 336/135; 244/223; 200/157; 74/471 R, 471 XY; 273/DIG. 28, 148 B

[56] References Cited

U.S. PATENT DOCUMENTS

| | | | |
|---|---|---|---|
| 4,464,015 | 7/1984 | Netzer | 336/135 |
| 4,489,938 | 12/1984 | Darzinskis | 273/DIG. 28 X |
| 4,514,600 | 4/1985 | Lentz | 273/148 B |
| 4,558,609 | 12/1985 | Kim | 74/471 XY |
| 4,574,651 | 3/1986 | Nordström | 74/471 XY |

Primary Examiner—Cornelius J. Husar
Assistant Examiner—Joseph A. Fischetti
Attorney, Agent, or Firm—James E. Nilles; James R. Custin

[57] ABSTRACT

A control device for producing electrical signals which correspond to manual movements of a stick part and which are used for adjustment of a controlled element has a relatively stationary body part with a hand supporting surface and a stick projecting outward from that surface to be embraced by an operator's hand. The stick comprises a laterally swingable outer stick part end-to-end with an inner stick part fixed to the body. A rod-like spring element in a chamber in the stick has an end portion fixed to each stick part to swingably connect the outer stick part of the inner one and bias the outer one to a neutral position. A signal emitting device in the chamber is mounted alongside the spring element and is operatively connected with it.

5 Claims, 6 Drawing Figures

CONTROL DEVICE

FIELD OF THE INVENTION

This invention relates to a control device comprising a manually movable control stick and means for producing electrical signals which correspond to movements of the control stick and which serve to adjust a controlled element, a typical application of such a control device being a stick for controlling adjustments in azimuth and elevation of an aircraft-carried radar antenna; and the invention is more particularly concerned with a control device of that type which is so arranged that both stick biasing means and signal generating means can be housed within a cavity in the control stick.

BACKGROUND OF THE PRIOR ART

A control device of the general type to which this invention relates is disclosed in U.S. Pat. No. 4,574,651. Such a device has a control stick comprising an inner stick part which is fixed to a housing and which projects beyond a hand supporting surface on that housing, and an outer stick part which is connected end-to-end with the inner stick part and is swingable relative to it. The stick is embraced by an operator's hand, the heel of which rests on the supporting surface with at least the little finger curled around the inner stick part.

It is evident that any cavity in the stick parts of such a control device must be relatively small. Heretofore it has been considered impossible to build into such a cavity both a biasing means for urging the outer stick part to a neutral position and a device for producing electrical signals in response to movements of the outer stick part away from its neutral position. A control device of this type disclosed in U.S. Pat. No. 4,531,080 comprised a gimballed transmission linkage, a portion of which was housed in the cavity in the stick and which transferred control movements to signal generators located outside of the stick parts and to stick biasing means located adjacent to the signal generators. This arrangement was not optimum for an aircraft installation because of its relatively heavy weight and the relatively large amount of space that it occupied. Especially where the movable stick part must be swingable about each of two mutually perpendicular axes, the rather complicated linkage and its gimbal mountings that was needed for transmitting the stick movements to the respective signal generators was necessarily expensive, and, even when made with care and precision, it offered possibilities for loose play and binding.

SUMMARY OF THE INVENTION

The general object of the present invention is to provide a control device of the character described wherein the complicated and expensive gimballed linkage heretofore employed is replaced by a lighter and less expensive structure comprising a one-piece spring element that serves both as a connection between the stick parts and as a means for biasing the movable stick part to a neutral position, said spring element being compact enough to be substantially wholly located in a chamber inside the stick and to leave room in that chamber for electrical signal generating means.

It is also an object of this invention to provide a control device of the character described, having a manually movable control stick part that is swingable in two degrees of motion and having a very simple and compact biasing means housed in a chamber in the stick that urges the movable stick part towards a neutral position and resists displacement of the movable stick part away from that position with a yielding force which is greater for one of those degrees of motion than for the other so that the respective biasing forces are matched to the muscular forces that an operator can conveniently exert in each degree of motion.

BRIEF DESCRIPTION OF THE DRAWINGS

In the accompanying drawings, which illustrate what are now regarded as preferred embodiments of the invention.

DETAILED DESCRIPTION OF PREFERRED EMBODIMENTS OF THE INVENTION

Figure 1:
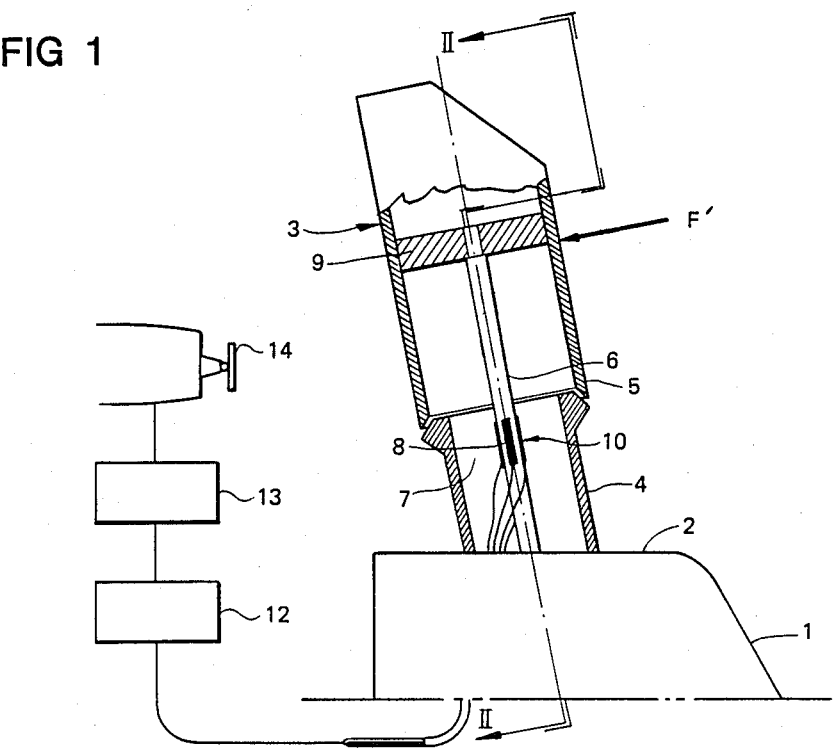
FIG. 1 is a view of the control device, partially in side elevation and partially in longitudinal section.

A control device embodying the principles of this invention has application in various fields, as for the control of sighting devices, land vehicles, marine vessels, industrial robots, loaders and digging machines. In the accompanying drawings, as an example of a demanding application for which the device is well suited, it is illustrated as installed in an airplane for controlling the positioning of a radar antenna in azimuth and elevation.

The control device illustrated in the drawings comprises a body part or frame 1 that can be stationary or movable in an airplane. If movable it can be mounted in the airplane cabin as disclosed in U.S. Pat. No. 4,574,651. The top of the body part forms a supporting surface 2 upon which the heel of an operator's hand can rest. Projecting outward from the supporting surface 2 is a control stick 3 that comprises two parts arranged end-to-end, namely an inner stick part 4 that is immovably secured to the body part 1 and an outer stick part 5 that is swingable relative to the inner stick part. During control movements, that is, when the outer stick part is caused to swing relative to the inner stick part, the supporting surface 2, by supporting the operator's hand, provides a reference for precise control movements.

The two stick parts 4, 5 are connected by means of a rodshaped spring element 6 that extends centrally through a chamber 7 in the stick, said chamber being defined by a cavity in each stick part that opens to the cavity in the other. One end portion of the spring element 6 is secured to the movable stick part 5 by means of a transverse rib 9 or the like on that outer stick part, while the other end portion of the spring element is securely clamped in a rib element in the body part 1 that can be located at approximately the level of the supporting surface 2. In its unloaded condition the spring element defines the neutral position of the outer stick part, that is, the position that is shown in the drawings. The flexing characteristics of the spring element, and thus the biasing forces that it applies to the outer stick part, are determined by the magnitude of bowing stiffness of the spring element and also by the location of the point or zone about which the outer stick part swings for control movements. These two parameters are in turn determined by the cross-section area and geometry of the spring element, and also by the variation in cross-section of the spring element along its free length.

In these respects the invention aims at an ergonometrically optimum configuration of the control stick, and for this it is important that the resistance moment of the spring element 6, considered in each of the various directions in which the outer stick part is permitted to swing, is well balanced to the physiological conditions under which an operator exerts force upon the control stick with his hand. These conditions are in fact not equally good in all directions.

By reason of this the control device in the preferred embodiments shown in the drawings has a spring element 5 with an elliptical cross-section. With respect to the mentioned physiological conditions, the cross-section ought to be so oriented that the minor axis of the ellipse and the resistance moment of the spring element that is related to it applies during sideward control movements, when a force F acts as in FIGS. 2 and 5 and the operator performs a turning of the hand and forearm. In this first degree of freedom of the control stick it is harder for the operator to exert muscular force than when he bends his hand in a movement forward or backward about the wrist to apply to the stick a force F', see FIGS. 1 and 4, that moves it in a second degree of freedom. In the second degree of freedom the stick should therefore have a larger resistance moment, corresponding to the major axis of the ellipse.

The spring element 6 can suitably have a constant cross-section area along the whole of its free length as the drawing shows. If a displacing force is applied to the outer stick part 5 in any arbitrary direction perpendicular to the longitudinal axis of the stick and at the elevation of the transverse rib 9, the center or zone 8 of swinging of the spring element will be located at one-third of the free length of that element from the securement point in the body part 1. Other forms of the spring element are possible as alternatives; for example, it can be conical or pyramidal with a downwardly increasing cross-section area, and in such cases the mentioned center or zone of swinging will be located at a different place along the spring element.

When the stick is manipulated it is so grasped by the operator's hand that the two parts of the stick are embraced, whereby at least the little finger surrounds the inner stick part 4 and the hand is supported against the supporting surface 2. With this the center or zone 8 about which the outer stick part swings will be located in the middle of the gripping position of the hand. When the stick is displaced from its neutral position the spring element gives rise to biasing forces that tend to return the stick to its neutral position.

For generation of signals that represent the position of the outer stick part in relation to the inner one, a signal emitting sensor element is arranged, according to a characteristic of the invention, alongside the spring element 6. Various solutions based upon various types of position sensors can thus be employed in the control device.

Figure 2:
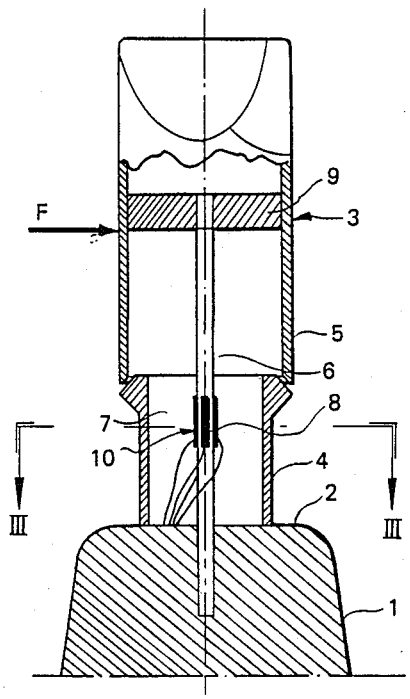
FIG. 2 is a view of the device in vertical section on the plane of the line II—II in FIG. 1.
Figure 3:
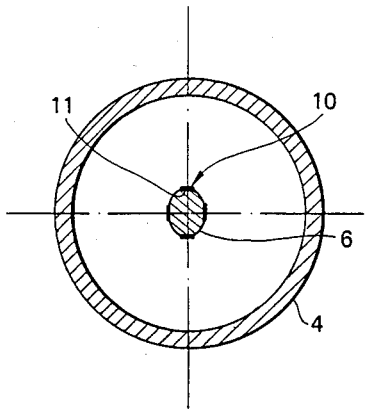
FIG. 3. is a view in cross-section, on an enlarged scale, on the plane of the line III—III in FIG. 2.

In FIGS. 1-3 is shown a solution wherein four strain gauges 10 are mounted on surfaces 11 that are provided on the body part 1 at the level of the above mentioned center or zone 8 of swinging. In the peripheral direction these surfaces and sensors are arranged pair-wise in the directions of the major axis and the minor axis, respectively, of the spring element cross-section, so that two of the sensors react to movements in one degree of motion (forward-backward) while the other sensor pair senses movements in the other degree of motion (sidewardly). The four strain gauges 10 consequently produce voltages which correspond to the magnitude of swinging displacement of the outer stick part from its neutral position in the respective directions and which, after assembly, represent the angular position and the direction that the outer stick part 5 assumes in relation to the inner stick part 4. The signal is proportional to the position with a good approximation, in all cases with the small angles of deflection of about 3°-5° that are usually involved in connection with an airplane.

Figure 4:
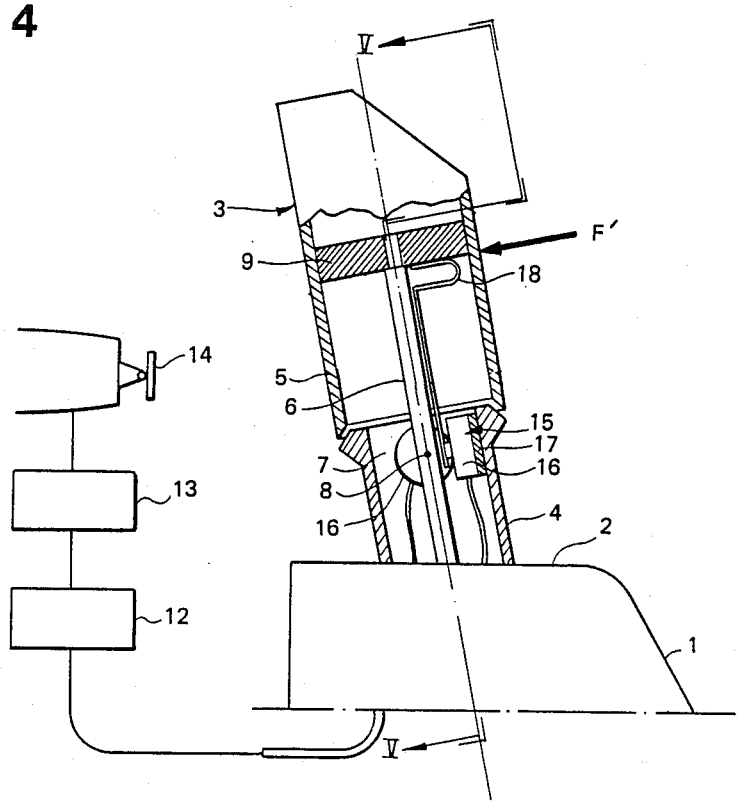
FIG. 4 is a view generally similar to FIG. 1 but illustrating a modified embodiment of the invention.
Figure 5:
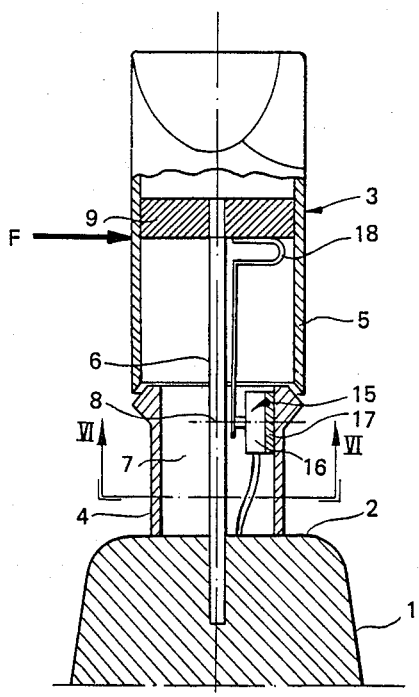
FIG. 5 is a view in longitudinal section on the plane of the line 5—5 in FIG. 4.
Figure 6:
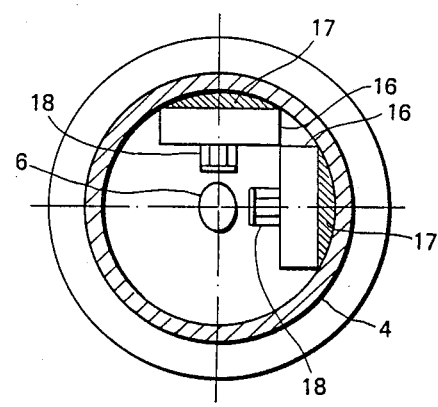
FIG. 6 is a view in cross-section on the plane of the line VI—VI in FIG. 5.

FIGS. 4-6 illustrate an embodiment having sensors or signal producing devices 15 in the form of two differential transformers 16 of the RVDT (rotary variable differential transformer) type, which are mounted on the inside of the stationary stick part on pads 17 that are formed or secured therein. The sensors 15 are so mounted that their rotatable elements have their axes of rotation at 90° to one another, transverse to the spring element and extending through the center or zone 8 of swinging of the spring element, and, if the spring cross-section is elliptical, those rotational axes should also coincide with the major axis and the minor axis, respectively, of the ellipse. The movements of the movable stick part 5 in each degree of freedom are transferred from the securement element 9 by means of a feeler 18 for each differential transformer 15 which is formed as a leaf spring that is stiff in a plane normal to the rotational axis of its differential transformer but is flexible in the directions parallel to that axis. In consequence, each feeler 18 faithfully transfers to its differential transformer 16 a movement or motion component in the plane just mentioned. On the other hand, stick movements in the last mentioned directions, or components thereof, do not affect the same differential transformer.

The signals generated in the control stick device are processed in a signal processing unit 12 from which they are fed to a servo unit 13 that effects adjusting displacement of a radar antenna 14, shifting it in the same direction as the stick deflection and, in relation to a common reference direction which in the described application is preferably the longitudinal axis of the airplane, bringing it to an angle that is proportional to the stick deflection.

From the foregoing it will be seen that the invention eliminates the disadvantages of known constructions that are pointed out hereinabove, by reason of its freeing the chamber in the stick that would otherwise be occupied by a universal joint or the like, thus providing the possibility for building the signal emitter as well as the spring element into the stick itself.

The control device construction according to the invention is thus characterized by great mechanical simplicity and a reliable signal function, even in installations wherein a difficult dynamic environment prevails.

I claim:

1. A control device whereby manual movements of a stick part are caused to generate electrical signals that can be employed to adjust a controlled element, said control device comprising a relatively fixed part that provides a supporting surface from which said stick part projects to be embraced by an operator's hand resting on said supporting surface, said stick part being swingable laterally in opposite directions relative to said fixing part to and from a neutral position, and electrical signal emitting means operatively connected with said stick part and arranged to produce outputs which can be fed to said controlled element and which correspond to both amount and direction of displacement of said stick part from said neutral position, said control device being characterized by:

A. a rod-shaped laterally flexible spring element which has opposite end portions and which extends substantially centrally through an elongated chamber defined by a cavity in each of said parts that opens to the cavity in the other, said spring element having an end portion disposed in each of said parts;

B. cooperating means on each of said parts, engaging the end portion of the spring element that is disposed therein, for confining each end portion of the spring element against motion relative to the part in which it is disposed so that said stick part is connected with said fixed part by said spring element, is swingable relative to the fixed part by reason of the lateral flexibility of the spring element and is biased to its neutral position by the spring element; and C. said signal emitting means being housed in said chamber alongside said spring element.

2. A control device whereby manual movements of a stick part are caused to generate electrical signals that can be employed to adjust a controlled element, said control device comprising a frame that provides a surface for supporting an operator's hand, a stick which can be embraced by a hand resting on said surface and which comprises an inner stick part that is fixed to said frame and projects beyond aid surface and an outer stick part connected end-to-end with said inner stick part for lateral swinging movement in opposite directions to and from a neutral position about a center which is located in the stick, and electrical signal emitting means operative connected with said outer stick part and arranged to produce outputs which can be fed to said controlled element and which correspond to both amount and direction of displacement of said outer stick part from said neutral position, said control device being characterized by:

A. a rod-shaped laterally flexible spring element which has opposite end portions and which extends substantially centrally through a chamber in the stick defined by a cavity in each of stick parts that opens to the cavity in the other, said spring element having an end portion disposed in each of said stick parts;

B. cooperating means on each of said stick parts and on the end portion of the spring element that is disposed therein for confining the stick part against displacement relative to that end portion, so that the outer stick part is connected with the inner stick part by said spring element, is swingable relative to the inner stick part by reason of the lateral flexibility of the spring element and is biased to its neutral position by the spring element; and C. said signal emitting means being housed in said chamber alongside said spring element.

3. The control device of claim 2 wherein said spring element is flexible laterally in opposite directions in two mutually perpendicular degrees of flexing motion to provide said outer stick part with two corresponding degrees of freedom for swinging movement, in a first of which said outer stick part is actuated by forward and backward bending of an operator's hand about the wrist and in the second of which it is actuated by sideward turning of the operator's hand and forearm, further characterized by:

said spring element having, along at least a major portion of its length between its said end portions, a width in the direction of one of said degrees of flexing motion that is greater than its width in the other of said degrees of flexing motion, so that biasing moments exerted by the spring element in each of said degrees of its flexing motion are matched to the muscular forces which the operator can comfortably exert in the corresponding degrees of swinging movement of the outer stick part.

4. The control device of claim 2, further characterized by:

(1) said spring element having, along at least a portion of its length between its said end portions, a pair of flat surfaces that face in opposite directions; and (2) said electrical signal emitting means comprising a pair of strain gauges, one of which is fixed to each of said flat surfaces to be responsive to bowing deformation of the flat surface that attends lateral flexing of the spring element.

5. The control device of claim 2, further characterized by:

(1) said signal emitting means comprising a differential transformer having an element rotatable about an axis of rotation, said differential transformer being mounted on said frame within said chamber and alongside the spring element with said axis of rotation substantially transverse to the length of the spring element; and (2) a feeler having a connection with said rotatable element that is concentric to said axis of rotation and having a connection with said spring element that is spaced along the length of the spring element from the end portion thereof that is disposed within the inner stick part, said feeler being substantially inflexible in directions transverse to said axis of rotation and having a portion between its said connections that is resiliently flexible in directions parallel to said axis of rotation.

* * * * *